(No Model.)
W. E. SCOTT & A. MIKS.
EARTH AUGER.
No. 501,630. Patented July 18, 1893.
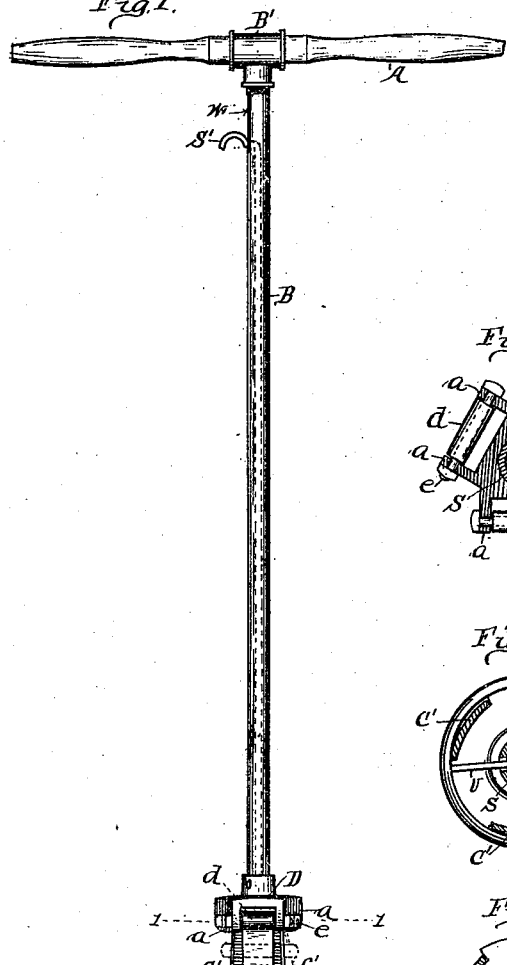
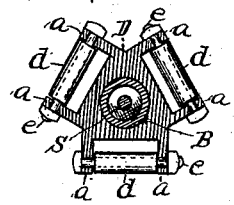
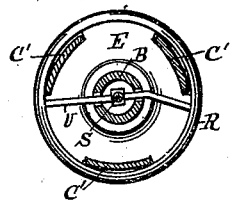
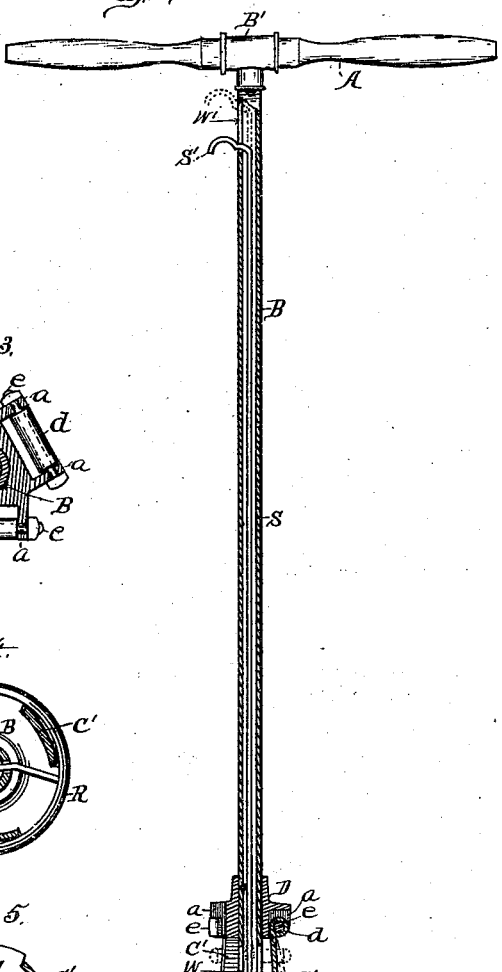
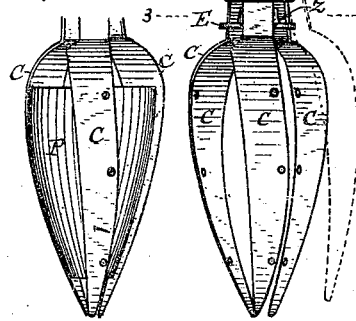
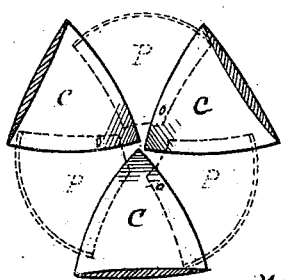
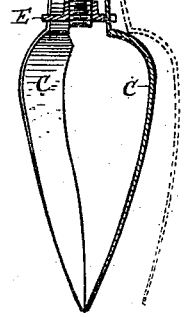
Witnesses.
W. C. Hutchins.
F. H. Poore.
Inventors.
William E. Scott.
Ambrose Miks.
By Wm. J. Hutchins Atty

UNITED STATES PATENT OFFICE.

WILLIAM E. SCOTT AND AMBROSE MIKS, OF WICHITA, KANSAS.

EARTH-AUGER.

SPECIFICATION forming part of Letters Patent No. 501,630, dated July 18, 1893.

Application filed January 23, 1893. Serial No. 459,464. (No model.)

*To all whom it may concern:*

Be it known that we, WILLIAM E. SCOTT and AMBROSE MIKS, citizens of the United States of America, residing at Wichita, in the county of Sedgwick and State of Kansas, have invented certain new and useful Improvements in Earth-Augers, of which the following is a specification, reference being had therein to the accompanying drawings and the letters of reference thereon, forming a part of this specification, in which—

Figure 1. is a side view of the auger; Fig. 2. a longitudinal-sectional view of the same; Fig. 3. a cross-sectional view on line 1 of Fig. 1; Fig. 4. a similar view on line 2 of Fig. 1; Fig. 5. a similar view on line 3 Fig. 1; Fig. 6. a cross-sectional view of the auger cutting blades; Fig. 7. a detailed side view of said cutting blades, and the detachable wings thereof, and Fig. 8. is a detailed perspective of one of said blade wings.

This invention relates to certain improvements in a hand post-hole auger, and consists in certain novel construction and arrangement of the operative parts thereof, which improvements are fully set forth and explained in the following specification and pointed out in the claims.

Referring to the drawings B represents the auger shank and is preferably made of gas-piping, and is provided at its upper end with a hollow cross-head B' into which is secured a cross-handle A for operating the auger, and is further provided at its lower end with an annular flange E, preferably made of cast iron and centrally bored and tapped through a central hub and turned on the screw-threaded end of the shank. A distance above said flange, arranged on the said shank, is a cast head D, having a central bore through which the shank is placed, and held into position by a cross key to one side from the shank center, so as not to obstruct the hollow of the shank, as shown. Said head D is provided, about its side with three pairs of laterally extending and equidistant ear lugs $a$, preferably made capped ones by the construction of the casting, as shown.

$c$ represents the cutting blades of the auger, and are three in number, and are curved longitudinally in such manner as to bow from each other, at their body portion, and so their points will be brought relatively close to each other, as represented, and are made with straight arms $c'$ at their upper end, which arms terminate with eyes $d$ respectively between the pairs of ear lugs $a$, where they are respectively hinged by means of cross-bolts $e$, a bolt at each hinge, as shown. In their normal position, the arms $c'$ of cutting blades $c$, bear against the annular flange E, at their lower portion, each arm resting in a separate notch, or recess, Z of said flange, which flange prevents the said blades from being brought too close one to the other, or toward a vertical center of the auger, and the shoulders of said flange notches $z$ prevent the blade arms $c'$ from being held back, when operating the auger, and therefore prevent the hinge joints of said arms from being strained when using the auger.

R represents a ring sleeved on the auger about the arms $c'$ of the blades, and as the arrangement of said arms is such that, they diverge, from a vertical center of the auger at their lower portion, and therefore when said ring is raised to near the arm hinge joints said arms may have space within the ring so that one of them may swing out and thereby swing out one cutter blade, as represented by dotted lines in Figs. 1 and 2, and when the ring is lowered it fits close against said arms and holds them locked against swinging outward, as represented by full lines in said figures. As a means of raising said ring R we have represented the ring as provided with a cross bar V arranged through a vertical slot W of shank B, and have provided a rod S, within said shank, having an eye at its lower end through which the ring cross-bar V passes, and terminating, at its upper end with a side extending finger hook S', projecting from shank B through a vertical slot W', when, by such device, the operator may, when using the auger, lift up said rod S by grasping the hook S' thereof and thereby raise the ring R; however such device may or may not be used for raising the ring R, as may be desired, and if omitted the said ring may readily be raised by grasping it, direct, with the hand.

In use the auger is first placed in an upright position on the ground at the place where a hole is to be made. The cross-handle is then grasped and rotated, or turned about, horizontally, which action will rotate the cutter blades c and cause them to cut into the earth, as they advance in their rotary circuit; their cutting edge being set farther from a vertical center of the auger than the back edge, which arrangement is more clearly illustrated in Fig. 6, and enables the said cutters to shear the soil, in their rotary movement, and deposit the soil as it is sheared, or cut, by such action, within the space between said blades, and when said space is filled with such cuttings, the auger is lifted from the hole, and the ring R moved up on the arms $c'$, when by holding the auger in a horizontal position one cutter blade will, by gravity, or the combined action of gravity and weight of soil between the cutting blades, swing off from its cutting position, or by reason of the then horizontal position of the auger, will swing down, and thereby open a way for the release of the soil lifted from the hole. By again bringing the auger to a vertical position, the blade will by gravity resume its working position, and the ring will, then, by its own weight lower to such position as to lock the blades against further swinging off movement until it is again desired to empty the cuttings.

In some instances where the ground is loose, gravelly, or sandy, and therefore is liable to fall from between the blades c and therefore not properly clean the hole, we have provided wings P, made of sheet metal and curved to conform to the contour of the auger cutters, which are adapted to be attached, by means of screws, or small bolts, to the inner side, near the rear a back edge, of each cutting blade, as shown in Fig. 7, by full lines and represented by dotted lines in Fig. 6, and thus held so as to span the spaces between the blades, but held from each cutting edge of the blades a distance sufficient to permit the cuttings to enter the space between the blades and also between the said wings; but however said wings are not intended as a permanent fixture to the auger, and may be used only when the ground is of such character as to require their use.

Having thus described our invention, what we claim as new and useful, and desire to secure by Letters Patent, is as follows:

1. The auger consisting of the combination of the shank provided with the cross-handle; the notched or recessed annular flange fixed to the shank end; the head fixed upon the shank and provided with the laterally extending ear lugs; the cutter-blades provided with the arms hinged to said head; and the adjustable ring arranged about said arms, substantially as set forth.

2. In the auger described the combination with the cutting blades and the arms thereof hinged to the auger shank; of the adjustable ring arranged encircling said arms and provided with a cross-bar operating in a longitudinal cross-slot of the auger shank; and the rod arranged within the shank, and connected at one end to the ring cross-bar and terminating at its opposite end with finger hook extending sidewise from the shank through a longitudinal slot, substantially as and for the purpose set forth.

3. In the auger described the combination of the shank, the cutting blades provided with the arms independently hinged to the shank, and the ring adapted to be adjusted to jointly hold said arms against movement outward, or to release and permit said arms to independently, or jointly, move outward, substantially as set forth.

4. In the auger described, the combination with the cutting blades c and the arms $c'$ thereof hinged to the auger shank; of the wings adapted to be detachably attached to said blades in the manner substantially as and for the purpose specified.

WILLIAM E. SCOTT.
AMBROSE MIKS.

Witnesses:
WM. J. HUTCHINS,
F. H. POORE.